(12) United States Patent
Moriizumi et al.

(10) Patent No.: US 11,701,806 B2
(45) Date of Patent: Jul. 18, 2023

(54) RESIN COMPONENT, AND MOLDING METHOD AND MOLDING DEVICE FOR SAME

(71) Applicant: HONDA MOTOR CO., LTD., Tokyo (JP)

(72) Inventors: Taiki Moriizumi, Tochigi (JP); Yuuki Kami, Tochigi (JP); Noboru Hirano, Tochigi (JP); Toshihiro Saimura, Tochigi (JP); Hajime Miyamoto, Tochigi (JP); Atsushi Yusa, Tochigi (JP); Kazuhiro Kawano, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1148 days.

(21) Appl. No.: 16/337,115

(22) PCT Filed: Sep. 20, 2017

(86) PCT No.: PCT/JP2017/033827
§ 371 (c)(1),
(2) Date: Mar. 27, 2019

(87) PCT Pub. No.: WO2018/061905
PCT Pub. Date: Apr. 5, 2018

(65) Prior Publication Data
US 2020/0031036 A1    Jan. 30, 2020

(30) Foreign Application Priority Data

Sep. 30, 2016  (JP) ................. 2016-195047

(51) Int. Cl.
*B29C 45/16*  (2006.01)
*B29C 45/56*  (2006.01)
(Continued)

(52) U.S. Cl.
CPC ...... *B29C 45/1639* (2013.01); *B29C 45/1657* (2013.01); *B29C 45/561* (2013.01);
(Continued)

(58) Field of Classification Search
CPC ............ B29C 45/1639; B29C 45/1635; B29C 2045/1659; B29L 2031/3038
See application file for complete search history.

(56) References Cited

U.S. PATENT DOCUMENTS 5,458,361 A * 10/1995 Gajewski ............ B60R 21/2165
264/249
7,858,013 B2 * 12/2010 Izumo ................ B29C 45/1635
264/250
(Continued)

FOREIGN PATENT DOCUMENTS

JP        09-226413      9/1997
JP        2005-104319    4/2005
(Continued)

OTHER PUBLICATIONS

International Search Report, dated Dec. 5, 2017 (Dec. 5, 2017), 2 pages.

*Primary Examiner* — Edmund H Lee
(74) *Attorney, Agent, or Firm* — Rankin, Hill & Clark LLP (57) ABSTRACT

An instrument panel (10) includes a base material portion (20) made of a base material M1 and a different material portion (30) made of a different material M2 having a different thermal shrinkage from that of the base material M1, and in the instrument panel (10), the base material portion (20) and the different material portion (30) are connected in a state such that at least a part of the two materials do not overlap.

5 Claims, 3 Drawing Sheets

(51) Int. Cl.
　　　*B29K 105/02*　　　(2006.01)
　　　*B29L 31/30*　　　(2006.01)
(52) U.S. Cl.
　　　CPC ... *B29K 2105/02* (2013.01); *B29L 2031/3008* (2013.01); *B29L 2031/3038* (2013.01)

(56) References Cited

U.S. PATENT DOCUMENTS

| 9,067,560 | B2 * | 6/2015 | Walter | B60R 21/2165 |
| 2009/0057949 | A1 * | 3/2009 | Izumo | B29C 45/1635 |
| | | | | 264/274 |

FOREIGN PATENT DOCUMENTS

| JP | 2009-051121 | 3/2009 |
| JP | 2013-075447 | 4/2013 |
| WO | 2013/146312 | 10/2013 |

\* cited by examiner

RESIN COMPONENT, AND MOLDING METHOD AND MOLDING DEVICE FOR SAME

TECHNICAL FIELD

The present invention relates to a resin component formed from a plurality of resin materials, and a molding method and a molding device for the resin component.

BACKGROUND ART

Conventionally, an air bag door has been formed separately from an instrument panel of a vehicle and fitted in an opening portion in the instrument panel to be attached to the instrument panel.

In recent years, however, to improve the efficiency of the attaching work, there are cases where an air bag door is formed integrally with an instrument panel through injection molding (for example, refer to Patent Literature 1).

CITATION LIST

Patent Literature

Patent Literature 1: Japanese Patent Laid-Open No. 9-226413

SUMMARY OF INVENTION

Technical Problem

However, resin materials are selected to match technical properties required for an instrument panel and an air bag door, and hence, different resin materials are selected for use. Consequently, in a conventional technique like one described in, for example, Patent Literature 1, when a product is molded by injecting resin materials and is then removed from a cavity for cooling, an undesirable deformation such as strain can be generated in an air bag door due to a difference in thermal shrinkage factor. Although the air bag door or the like is covered by a skin, the external appearance of the air bag door is deteriorated.

The present invention has been made in view of the problem described above, and an object thereof is to provide a resin component, and a method and a device for molding the resin component that can suppress the generation of such undesirable deformation.

Solution to Problem

A resin component according to the present invention includes a first resin portion composed of a first resin material and a second resin portion composed of a second resin material having a different thermal shrinkage from a thermal shrinkage of the first resin material, the first resin portion and the second resin portion being connected together in a state of at least partially not overlapping, the resin component having a discontinuous portion at a portion inward of a boundary location of the second resin portion with the first resin portion.

According to the resin component of the present invention, when the resin component is molded in one cavity through injection molding, whereafter the resin product is removed from the cavity to be cooled, a deformation such as strain could be generated due to a relative difference in shrinkage between the first resin portion and the second resin portion due to the difference in thermal shrinkage factor between the first resin portion and the second resin portion. However, according to the resin component of the present invention, the deformation can be absorbed by the discontinuous portion. This can realize an improvement in the external appearance of the resin component.

In the resin component of the present invention, the second resin portion is preferably arranged so as to be at least partially surrounded by the first resin portion.

In such a case, the portion of the second resin portion that is surrounded by the first resin portion is restricted from shrinking freely by the first resin portion when the resin component is cooled. Although this tends to increase the deformation, the deformation can be absorbed by the discontinuous portion, and therefore, the improvement in the external appearance of the resin component can be realized effectively.

In the resin component of the present invention, the discontinuous portion is arranged intermittently along the boundary location.

In such a case, the deformation that is generated by the relative shrinkage difference between the first resin portion and the second resin portion can be absorbed entirely by the discontinuous portion that is arranged intermittently along the boundary location. This can realize a further improvement in the external appearance of the resin portion.

In the resin component of the present invention, the discontinuous portion is preferably opened on a surface opposite to a designed surface of the resin component.

In such a case, since no opening exists on the designed surface of the resin component, the external appearance of the resin component can be suppressed from deterioration.

In the resin component of the present invention, the discontinuous portion preferably has at least a bent portion.

Further, in the resin component of the present invention, the discontinuous portion preferably includes a cut having a V shape when seen from above, and a connecting point of two sides of a V shape of another through hole or bottomed hole is preferably positioned within an area defined by three sides connecting three end points of the V shape.

A method for molding a resin component according to the present invention is a method for molding a resin component in which a first resin portion composed of a first resin material and a second resin portion composed of a second resin material having a different thermal shrinkage from a thermal shrinkage of the first resin material are connected in a state of at least partially not overlapping, the method including supplying the first resin material into a portion of a cavity configured to mold the first resin portion of the molded resin component, and supplying the second resin material into a portion of the cavity configured to mold the second resin portion of the molded resin component, the cavity including a projection disposed at a portion closer to the second resin portion than a boundary location of the first resin portion and the second resin portion of the molded resin component.

According to the method for molding a resin component of the present invention, although a deformation such as strain is generated due to a relative difference in shrinkage between the first resin portion and the second resin portion that is generated, in turn, due to a difference in shrinkage factor between the first resin and the second resin after the resin component is removed from the cavity to be cooled, such deformation can be absorbed by deformation of a recessed portion formed by the projection. This can realize an improvement in external appearance of the resin component.

A device for molding a resin component according to the present invention is a device for molding a resin component in which a first resin portion composed of a first resin material and a second resin portion composed of a second resin material having a different thermal shrinkage from a thermal shrinkage of the first resin material are connected in a state of at least partially not overlapping, the device including a cavity including a projection disposed at a portion closer to the second resin portion than a boundary location between the first resin portion and the second resin portion of the molded resin component, a first supply nozzle configured to supply the first resin material into a portion of the cavity configured to mold the first resin portion of the molded resin component, and a second supply nozzle configured to supply the second resin material into a portion of the cavity configured to mold the second resin portion of the molded resin component.

According to the device for molding a resin component of the present invention, although a deformation such as strain is generated due to a difference in shrinkage factor between a base material portion and a different material portion, such deformation can be absorbed by recessed portions formed by a plurality of the projections. This can realize an improvement in external appearance of the resin component.

DESCRIPTION OF EMBODIMENT

An instrument panel 10 according to an embodiment of a resin component of the present invention will be described.

Figure 1:
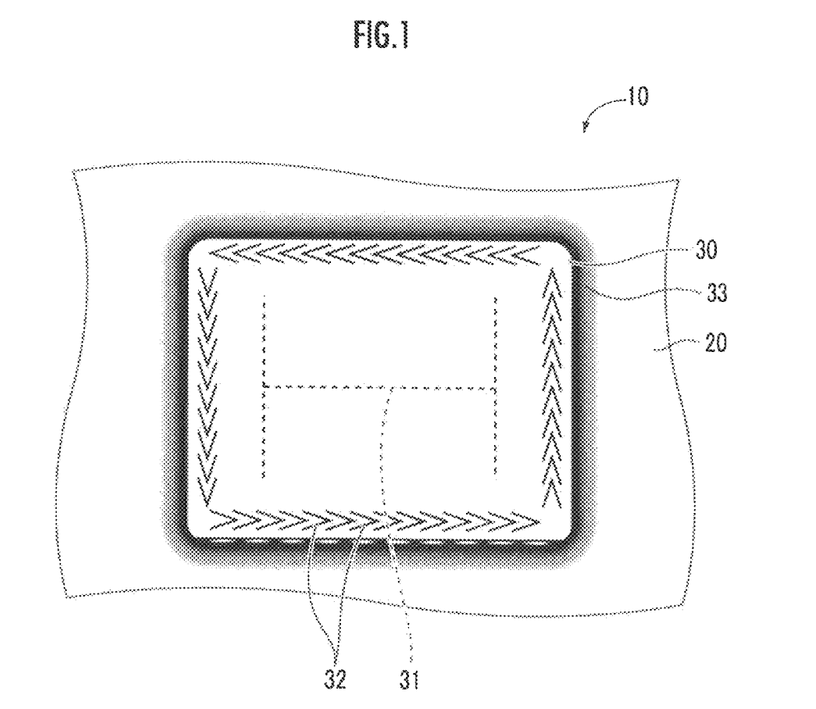
FIG. 1 is a partial conceptual top plan view of an instrument panel according to an embodiment of the present invention.

As illustrated in FIG. 1, the instrument panel 10 of a vehicle includes a base material portion 20 which corresponds to a first resin portion of the present invention, and which is made of a base material M1 corresponding to a first resin material of the present invention, and a different material portion 30 which corresponds to a second resin portion of the present invention, and which is made of a different material M2 corresponding to a second resin material of the present invention and being different from the base material M2. Although not illustrated, a skin, an instrument visor, a decorative laminated sheet, and the like are attached to the instrument panel 10.

The base material portion 20 constitutes a main body portion of the instrument panel 10. The base material portion 20 is made of the base material M1, which is a resin material normally used for an instrument panel, and in this embodiment, the base material portion 20 is made of polypropylene (PP). An opening 21 is formed in the base material portion 20.

The different material portion 30 constitutes a door (also referred to as a lid and hereinafter, referred to as an air bag door) for an air bag device for a front seat passenger, not illustrated. The different material portion 30 is made of the different material M2, which is a resin material normally used for an air bag door, and in this embodiment, the different material portion 30 is made of olefin-based elastomer (TPO). In this embodiment, a thermal shrinkage factor of the different material M2 is greater than a thermal shrinkage factor of the base material M1.

The different material portion 30 has a weak portion 31 that is easily broken when a bag of the air bag device is deployed. The weak portion 31 is, for example, an H-shaped tear line which is made thinner than other portions.

The base material portion 20 and the different material portion 30 are joined together in such a manner that the base material portion 20 surrounds the different material portion 30. Specifically, the different material portion 30 is disposed in the opening 21 formed in the base material portion 20 in such a manner as to close the opening 21.

Figure 2:
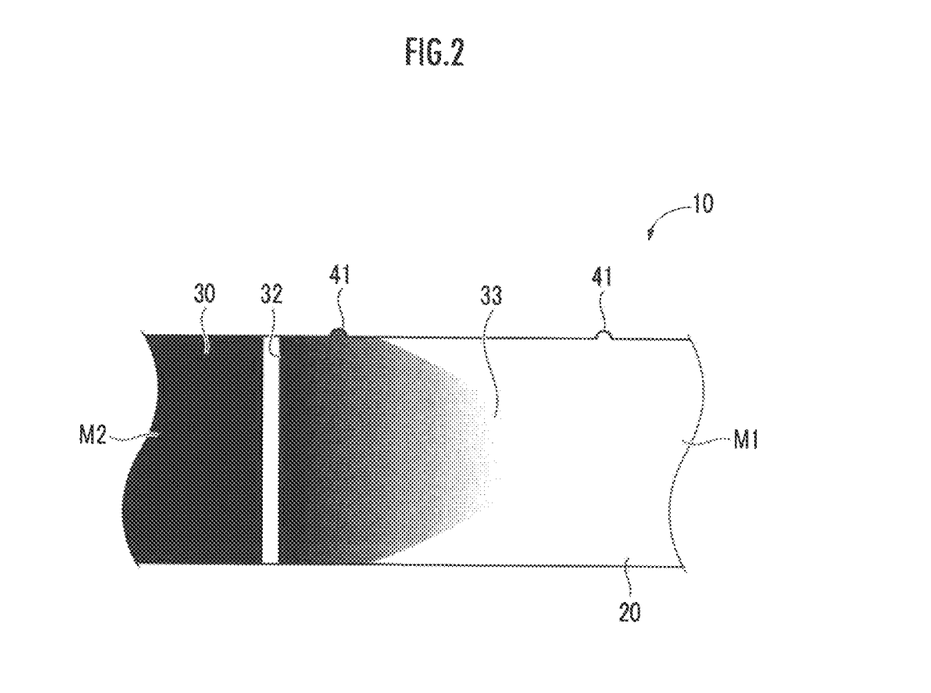
FIG. 2 is a schematic sectional view of the instrument panel.

As illustrated in FIG. 2, the base material portion 20 and the different material portion 30 are disposed in such a manner that the base material M1 and the different material M2 overlap each other in a thickness direction (an up-and-down direction) of the instrument panel 10 at a boundary location between them. Specifically, the different material M2 projects into the base material M1 while being mixed with the base material M1 in such a manner as to intrude into the base material portion 20 from the different material portion 30 side at the boundary location between the base material portion 20 and the different material portion 30. This joins the base material portion 20 and the different material portion 30 strongly and rigidly together.

FIG. 2 schematically illustrates this state, and the base material M1 is indicated in white, the different material M2 is indicated in black, and the area where the different material M2 mixes with the base material M1 is indicated with densities corresponding to mixing ratios of the different material M2 to the base material M1. FIG. 2 illustrates only a schematic example of the mixing state of the two materials.

Minute projections 41, which indicate a boundary of a cavity 140 that is closed by a frame-shaped core 113 as will be described later, are present near an outer side of the boundary location between the base material portion 20 and the different material portion 30. Then, the boundary location between the base material portion 20 and the different material portion 30 is present between the projections 41. Of the projections 41, one projection 41 is formed on an upper surface of the base material portion 20, while the other projection 41 is formed on an upper surface of the different material portion 30. The boundary location between the base material portion 20 and the different material portion 30 is located in a position closer to the base material portion 20 than a middle position of the projections 41.

As illustrated in FIG. 1, a plurality of through holes 32 are formed in a portion closer to the different material portion 30 than the boundary location of the instrument panel 10, that is, a portion near the boundary location of the different material portion 30. The plurality of through holes 32 are formed in such a manner as to surround the weak portion 31. The through holes 32 constitute one form of a discontinuous portion of the present invention.

Here, as illustrated in FIG. 1, each through hole 32 has a V shape when seen from above. The through holes 32 overlap each other in such a manner that a connecting point of two sides of the V shape, that is, a projecting point of the V shape of one through hole 32 is positioned in an area defined by three sides that connect three end points of the V shape of another through hole 32.

More specifically, each of the through holes 32 are disposed continuously in a row in parallel with a longitudinal direction of the boundary location between the base material portion 20 and the different material portion 30 with the V shapes overlapping in the way described above. As an example, when the base material portion 20 and the different material portion 30 have a thickness of 3.5 mm, and a long side and a short side of the different material portion 30 when seen from above are 290 mm and 190 mm, respectively, a line width of each V-shaped through hole 32 is 0.25 mm, and an angle of the V shape is 30 degrees. Then, a length of each side of the V of the through hole 32 is 25 mm, and an interval of adjacent V-shaped sides is 8 mm.

The shape of the through hole 32 is not limited to the V shape. The shape of the through hole 32 is preferably a U shape, a W shape, a wave shape, or the like that includes at least a bent portion. However, the shape of the through hole 32 may not include a bent portion and hence may be formed into the shape of a straight line, a circle, an ellipse, or the like. The through hole 32 may take a shape of a combination of a plurality of shapes.

Although the adjacent through holes 32 preferably overlap each other, the present invention is not limited to this configuration. Thus, only part of the plurality of through holes 32 may overlap.

Although the plurality of through holes 32 are preferably disposed continuously in the row in parallel with the longitudinal direction of the boundary location between the base material portion 20 and the different material portion 30, the present invention is not limited to this configuration. For example, the plurality of through holes 32 may be disposed into a plurality of rows, into a staggered configuration, or at random, or may be scattered.

Each through hole 32 may have different sectional shapes in a thickness direction. Then, in the through hole 32, inner wall surfaces that face each other in the thickness direction may come into abutment with each other to eliminate a space defined therebetween.

Holes having a bottom (bottomed holes, grooves) may be provided in place of the through holes 32. In the case where bottomed holes are provided, the bottomed holes can take various shapes as described in relation to the through holes 32.

The bottomed holes are preferably opened to a rear surface of the different material portion 30. Since this prevents openings of the bottomed holes from being present on a front surface, which is a designed surface of the instrument panel 10, the external appearance of the instrument panel 10 can be improved.

Next, an injection molding mold 100, which makes up an instrument panel molding device used in molding the instrument panel 10, will be described.

Figure 3:
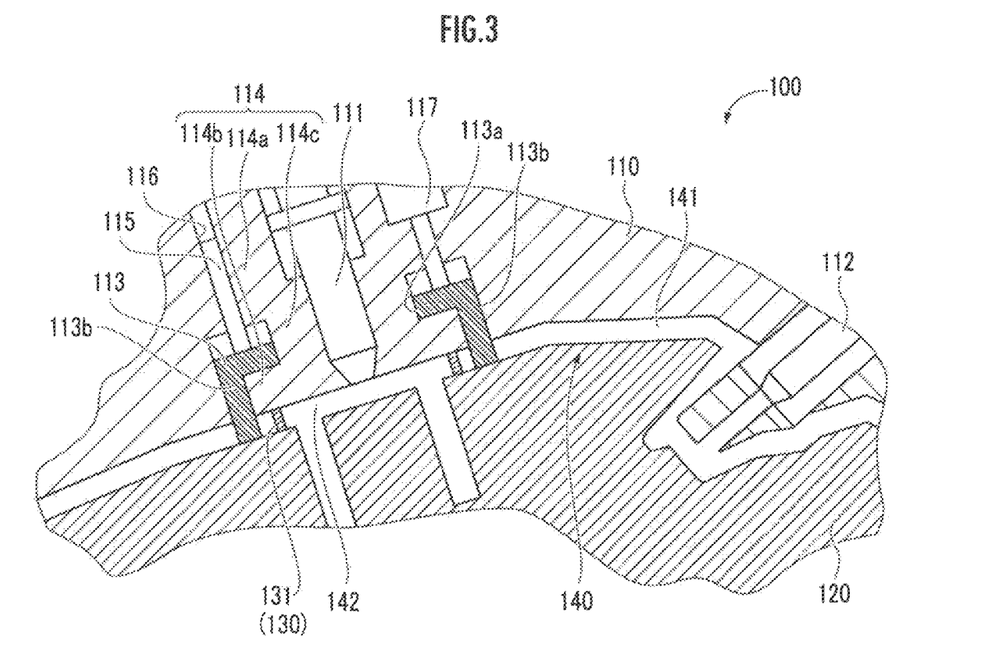
FIG. 3 is a sectional view illustrating schematically an injection molding mold of a molding device for the instrument panel according to the embodiment of the present invention, the sectional view illustrating a state where a frame-shaped core is position in a dividing position.

As illustrated in FIG. 3, the injection molding mold 100 includes an upper mold 110, a lower mold 120 and cores 130. The injection molding mold 100 is closed by moving the lower mold 120 relatively towards the upper mold 110, while the injection molding mold 100 is opened by moving the lower mold 120 relatively away from the upper mold 110.

The cavity 140 configured to mold the instrument panel 10 is formed by closing the injection molding mold 100 by the lower mold 120 and the upper mold 110. The cavity 140 includes a base material portion molding section 141 and a different material portion molding section 142. The base material portion molding section 141 corresponds to a first resin portion molding section of the present invention, and the different material portion molding section 142 corresponds to a second resin material portion molding section of the present invention.

The upper mold 110 includes a base material supply nozzle 112 configured to inject the base material M1 into the base material portion molding section 141, a different material supply nozzle 111 configured to inject the different material M2 into the different material portion molding section 142, and the frame-shaped core 113. The base material supply nozzle 112 corresponds to a first supply nozzle of the present invention, and the different material supply nozzle 111 corresponds to a second supply nozzle of the present invention.

The frame-shaped core 113 is disposed in such a manner as to surround a circumference of the different material supply nozzle 111. The frame-shaped core 113 functions to separate temporarily one area of the cavity 140 from the other area of the cavity 140.

The one area of the cavity 140 that is separated by the frame-shaped core 113 makes up the different material portion molding section 142 that is filled with the different material M2 injected from the different material supply nozzle 111 to thereby mold the different material portion 30. The other area of the cavity 140, which is an area other than the one area, makes up the base material portion molding section 141 that is filled with the base material M1 injected from the base material supply nozzle 112.

The frame-shaped core 113 functions to keep the base material M1 and the different material M2 separated from each other so that the different material M2 that fills the internal area defined by the frame-shaped core 113 and the base material M1 that fills the external area defined by the frame-shaped core 113 are prevented from coming into contact with each other. Although not illustrated, projecting portions configured to form a weak portion 31 in the different material portion 30 are provided on the different material molding section 142 in such a manner as to project upwards from the lower mold 120.

Figure 4:
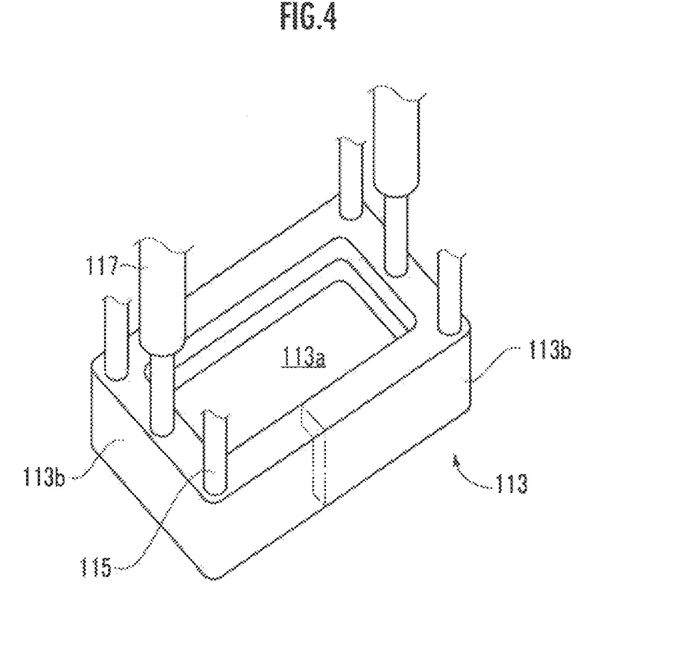
FIG. 4 is a perspective view illustrating schematically the frame-shaped core and a periphery thereof.

The frame-shaped core 113 is disposed with respect to the upper mold 110 so as to be movable towards the lower mold 120. Here, as illustrated in FIG. 4, the frame-shaped core 113 constitutes a frame body having a substantially rectangular outer frame and including a rectangular through hole 113a at a central portion thereof. A section of portions of the frame-shaped core 113 that correspond to four sides of the outer frame thereof taken along a direction from the upper mold 110 towards the lower mold 120 has an L shape with the upper mold 110 side being the base side, as illustrated in FIGS. 3 and 4.

As illustrated in FIG. 3, the upper mold 110 includes an injecting portion surrounding section 114 that is provided in such a manner as to surround a circumference of a distal end portion of the different material supply nozzle 111. An upper portion 114a and a lower portion 114b of the injecting portion surrounding section 114 are expanded wider than a central portion 114c of the injecting portion surrounding section 114 over whole lengths thereof into a substantially flange shape. The central portion 114c of the injecting portion surrounding section 114 has an outer circumferential surface that follows an inner circumferential surface of the through hole 113a of the frame-shaped core 113, and the frame-shaped core 113 is allowed to move along the outer circumferential surface of the central portion 114c.

A lower surface of the lower portion 114b of the injecting portion surrounding section 114 is positioned to face an upper surface of the lower mold 120 that constitutes a lower surface of the different material portion molding section 142 of the cavity 140. A space surrounded by those facing surfaces and inner wall surfaces of side walls 113b of the frame-shaped core 113 that is brought into abutment with the lower mold 120 makes up the different material portion molding section 142 of the cavity 140.

As illustrated in FIG. 4, slide guides 115 each having a cylindrical shape are provided in four corners of the upper surface of the frame-shaped core 113 in such a manner as to extend upwards, and the individual slide guides 115 are guided by a cylindrical holes 116 (refer to FIG. 3), not shown, that are formed in the upper mold 110, whereby the frame-shaped core 113 is allowed to move relative to a main body of the upper mold 110.

Distal end portions of pistons in a pair of cylinders 117 that are provided fixedly in the upper mold 110 are connected individually to both longitudinal end portions of an upper end face of the frame-shaped core 113. The frame-shaped core 113 reciprocates out of and into the main body of the upper mold 110 as the pistons of the cylinders 117 reciprocate. When the pistons of the cylinders 117 extends to move the frame-shaped core 113 towards the lower mold 120, whereby the frame-shaped core 113 is brought into abutment with the upper surface of the lower mold 120, the frame-shaped core 113 is positioned in a dividing position where the frame-shaped core 113 divides the cavity 140 into the base material portion molding section 141 and the different material portion molding section 142, as illustrated in FIG. 3.

Figure 5:
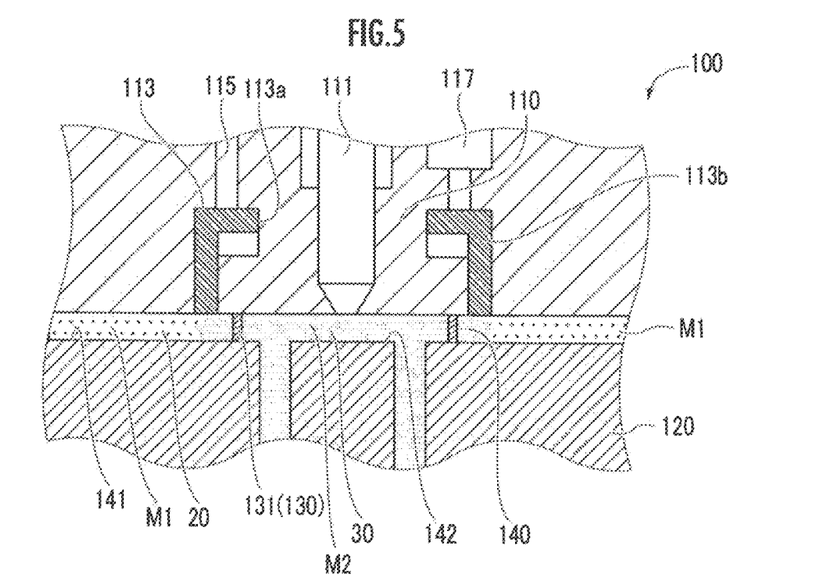
FIG. 5 is a sectional view illustrating schematically the injection molding mold of the molding device for the instrument panel, the sectional view illustrating a state where the frame-shaped core is positioned in an integrating position.

When the pistons of the cylinders 117 contract to move the frame-shaped core 113 away from the lower mold 120 as illustrated in FIG. 5, whereby the frame-shaped core 113 is accommodated in the upper mold 110, the frame-shaped core 113 is positioned in an integrating position where the frame-shaped core 113 does not divide the cavity 140 but integrates the base material portion molding section 141 and the different material portion molding section 142. In this way, the frame-shaped core 113 can move selectively between the dividing position and the integrating position.

The cores 130 are dies for forming the through holes 32 in the different material portion 30. The cores 130 are fixed to the lower mold 120 using known means. However, the cores 130 may be fixed to the upper mold 110, and further, the cores 130 may be divided to be fixed to the upper mold 110 and the lower mold 120.

In the cores 130, with the frame-shaped core 113 staying in the dividing position, a plurality of projections 131 are provided along a full circumference of a portion lying inwards of an inner side of the side walls 113b of the frame-shaped core 113 in such a manner as to surround the portion. Each projection 131 has a V shape, and when the base material portion 20 and the different material portion 30 have the dimensions described above including the thickness, a line width of each V-shaped projection 131 is 1.0 mm, and an angle of the V shape is 30 degrees. Then, a length of each side of the V of the projection 131 is 25 mm, and an interval between the sides of adjacent V-shaped projections 131 is 8 mm.

The projections 131 of the cores 130 are positioned along the fill circumference of a portion lying inwards of an outer circumferential portion of the different material portion molding section 142 in the cavity 140.

Next, a method for molding the instrument panel 10 according to an embodiment of a method for molding the resin component of the present invention using the device for molding the instrument panel 10 according to the embodiment of the method for molding the resin component of the present invention will be described.

The method for molding the instrument panel 10 includes a cavity dividing step S11, a base material filling step S12, a different material filling step S13, a frame-shaped core opening step S14, a different material pressing step S15, and a mold opening step S16.

Firstly, the cavity dividing step S11 is executed. In the cavity dividing step S11, the lower mold 120 is advanced relatively towards the upper mold 110 to close the mold, whereby the cavity 140 is formed as illustrated in FIG. 3. At this time, the frame-shaped core 113 is present in the dividing position, and the cavity 140 is divided into the base material portion molding section 141 and the different material portion molding section 142 by the frame-shaped core 113. At this time, the projections 131 of the cores 130 are positioned along the full circumference of the portion lying inwards of the outer circumferential portion of the different material portion molding section 142 within the cavity 140.

Next, the base material filling step S12 is executed. In the base material filling step S12, as illustrated in FIG. 5, the base material M1 is injected from the base material supply nozzle 112 to fill the base material portion molding section 141. Then, a first pressure is exerted on the base material M1 in the base material portion molding section 141 by virtue of a pressure under which the base material M1 is injected from the base material supply nozzle 112.

Next, the different material filling step S13 is executed. In the different material filling step S13, as illustrated in FIG. 5, the different material M2 is injected from the different material supply nozzle 111 (refer to FIG. 3) to fill the different material portion molding section 142. Then, a second pressure that is greater than the first pressure is exerted on the different material M2 in the different material portion molding section 142 by virtue of a pressure under which the different material M2 is injected from the different material supply nozzle 111.

Next, the frame-shaped core opening step S14 is executed. In the frame-shaped core opening step S14, a state in which the first pressure is acted on the base material M1 in the base material filling step S12 and also the second pressure is acted on the different material M2, is maintained, the frame-shaped core 113 is withdrawn from the lower mold 120 to thereby open the frame-shaped core 113 and move it to the integrating position, whereby shifting from the state where the cavity 140 is divided into the base material portion molding section 141 and the different material portion molding section 142 to the state where the base material portion molding section 141 and the different material portion molding section 142 are integrated.

The different material pressing step S15 is executed at the same time as the frame-shaped core opening step S14. In the different material pressing step S15, the second pressure continues to be exerted on the different material M2 while maintain a state in which the first pressure is kept exerted on the base material M1.

By doing this, the base material M1 and the different material M2 expand to intrude into a space of the cavity 140 that is defined by the frame-shaped core 113, so that the base material M1 and the different material M2 come into contact with each other and are then mixed together. Heat of portions of the base material M1 and the different material M2 that are in abutment with the upper mold 110 or the lower mold 120 is conducted greatly to the upper mold 110 or the lower mold 120, and hence, those portions set earlier than interior portions of the base material M1 and the different material M2.

Accordingly, in a central portion that sets slowly, the different material M2 on which the greater second pressure is exerted displaces the base material M1 on which only the smaller first pressure is exerted and that has not yet set, and then intrudes into an interior of the base material M1 in such a manner as to project more at the central portion. Thereafter, the base material M1 and the second material M2 are cooled to set in a state when the different material M2 is intruded into the base material M1 at the portion where the distal end portion of the frame-shaped core 113 is withdrawn.

Next, the mold opening step S16 is executed. In the molding executing step S16, the mold is opened by withdrawing the lower mold 120 away from the upper mold 110 relatively. Then, the instrument panel 10 made up of the base material portion 20 and the different material portion 30 is removed from the injection molding mold 100.

Since the projecting portions, not illustrated, which are configured to form the weak portion 31 in the different material portion 30, project towards an interior of the different material portion molding section 142 from the lower mold 120, the weak portion 31 is formed in the different material portion 30 by the projecting portions.

In addition, since the projections 131 of the cores 130 are positioned along the full circumference of the portion lying inwards of the outer circumferential portion of the different material portion molding section 142 in the cavity 140, a plurality of through holes are formed in the different material portion 30 by these projections 131 in such a manner as to follow an external shape defined by the projections 131.

Although the instrument panel 10 is cooled further after it is removed from the injection molding mold 100, the shape of the instrument panel 10 is not specified by the injection molding mold 100 at this time.

Since the thermal shrinkage factor of the different material M2 is greater than the thermal shrinkage factor of the base material M1, a degree at which the different material portion 30 shrinks is greater than a degree at which the base material portion 20 shrinks when they are cooled after being removed from the injection molding mold 100. In addition, since the different material portion 30 is surrounded by the base material portion 20, the difference in shrinkage is hardly released. Thus, there are fears that a deformation such as strain is generated near the boundary location between the base material portion 20 and the different material portion 30 unless a plurality of through holes are present.

In this embodiment, since the plurality of through holes are formed inwards of the boundary location of the different material portion 30 with the base material portion 20, when the base material portion 20 and the different material portion 30 shrink as they are cooled, the difference in shrinkage between the two material portions can be absorbed by the through holes being deformed in such a manner as to be collapsed. This can realize an improvement in external appearance of the instrument panel 10. The through holes in the different material portion 30 described above result from the collapsed deformation of the through holes 32 in the different material portion 30 that are present before cooling.

Since the through holes in the different material portion 30 are formed continuously while overlapping one another, the through holes can absorb such deformation effectively, thereby making it possible to realize a further improvement in external appearance of the instrument panel 10. Each of the through holes of the different material portion 30 has the V shape, and it is found out by the results of experimentations carried out by the inventor that the V shape can absorb such deformation more effectively than other shapes such as, for example, a straight-like shape and a circular shape.

The base material portion 20 and the different material portion 30 can be molded integrally by the cavity 140 that is defined by the single injection molding mold 100. Thus, since it is not necessary to include a step of molding the different material portion 30 in advance using a separate injection molding mold, the instrument panel 10 can be molded through a smaller number of steps and with good working efficiency.

Since the different material portion molding section 142 is defined in the cavity 140 by use of the frame-shaped core 113, an excessive consumption of the different material M2 can be suppressed that would be caused as a result of the different material M2 flowing more than required within the cavity 140.

Since the different material M2 is allowed to intrude into the base material M1 by withdrawing the frame-shaped core 113 to establish a communication between the base material portion molding section 141 and the different material portion molding section 142 after filling the base material portion molding section 141 with the base material M1 and filling the different material portion molding section 142 with the different material M2, the base material portion 20 and the different material portion 30 can be joined together strongly and rigidly. Shrink that is generated by the difference in thermal shrinkage factor between the base material M1 and the different material M2 at the boundary location between the base material portion 20 and the different material portion 30 can be absorbed, and a deformation such as strain that is generated by the difference in shrinkage factor between the base material M1 and the different material M2 on and after opening the mold can be suppressed.

The present invention is not limited to the embodiment that has been described heretofore. For example, in the embodiment, the plurality of V-shaped projections 131 are formed on the cores 130, the plurality of V-shaped through holes are formed in the different material portion 30, and the V-shaped through holes 32 are formed after cooling. However, the shape of the projections 131 formed on the cores 130 is not limited to the V shape, and hence, the projections 131 may have any shape, provided that the through holes 32 are formed into the shape described above.

As has been described before, bottomed holes may be formed in the different material portion 30 in place of the through holes 32. In this case, the projections formed on the cores 130 should be those that leave a gap between the lower surface of the upper mold 110 or the upper surface of the lower mold 120 and themselves in the mold closed state. The bottomed holes also constitute one form of the discontinuous portion of the present invention.

The discontinuous portion formed in the different material portion 30 is not limited to the through holes 32 or the bottomed holes. For example, the discontinuous portion may take a form in which side wall portions of the through holes or the bottomed holes are in contact with one another or may be a cut.

The thermal shrinkage factor of the different material M2 is described as being greater than the thermal shrinkage factor of the base material M1. However, the thermal shrinkage factor of the different material M2 may be smaller than the thermal shrinkage factor of the base material M1. In this case, when the base material portion 20 and the different material portion 30 shrink as they are cooled, the difference in shrinkage can be absorbed by the discontinuous portion such as the through holes being deformed in such a manner as to expand.

The base material portion 20 and the different material portion 30 are described as being joined together in such a manner that the base material portion 20 surrounds the different material portion 30 along the full circumference of the latter. However, the present invention is not limited to this configuration, and the base material portion 20 and the different material portion 30 may be joined together in such a manner that the base material portion 20 surrounds the different material portion 30 at least partially. In this case, although a regional portion of the different material portion 30 that is surrounded by the base material portion 20 is restrained by the base material portion 20, the difference in shrinkage generated when they are cooled can be absorbed by the discontinuous portion.

The present invention may be applied to a configuration in which the base material portion 20 and the different material portion 30 are joined together along at least one side. In this case, too, the different material portion 30 is restrained by the base material portion 20 along the one side where the different material portion 30 is joined to the base material portion 20, and the difference in shrinkage is generated along the one side when they are cooled; however, the difference in shrinkage can be absorbed by the discontinuous portion.

The resin component is described as being applied to the instrument panel 10. However, the resin component according to the present invention is not limited to the instrument panel 10 and hence may be applied to any component in which the base material portion made of the base material M1 and the different material portion made of the different material M2 are joined together in at least partially non-overlapping state.

REFERENCE SIGNS LIST

10: instrument panel (resin component); 20: base material portion (first resin portion); 21: opening; 30: different material portion (second resin portion); 31: weak portion; 32: through hole (discontinuous portion); 41: projection; 100: injection molding mold; 110: upper mold; 111: different material supply nozzle (second supply nozzle); 112: base material supply nozzle (first supply nozzle); 113 frame-shaped core; 120: lower mold; 131: projection; 130 core; 140: cavity; 141: base material portion molding section (first resin portion molding section); 142: different material portion molding section (second resin portion molding section); M1: base material (first resin material); M2: different material (second resin material).

The invention claimed is:

1. A resin component comprising:
a first resin portion composed of a first resin material; and
a second resin portion composed of a second resin material having a different thermal shrinkage from a thermal shrinkage of the first resin material, the first resin portion and the second resin portion being connected in a state of at least partially not overlapping,
the resin component further comprising:
a discontinuous portion at a portion inward of a boundary location of the second resin portion with the first resin portion,
wherein the discontinuous portion is a cut having a V shape when seen from above, and a connecting point of two sides of a V shape of another through hole or bottomed hole is positioned within an area defined by three sides connecting three end points of the V shape.

2. The resin component according to claim 1, wherein the second resin portion is arranged so as to be at least partially surrounded by the first resin portion.

3. The resin component according to claim 1, wherein the discontinuous portion is arranged intermittently along the boundary location.

4. The resin component according to claim 1, wherein the discontinuous portion is opened on a surface opposite to a designed surface of the resin component.

5. A method for molding a resin component in which a first resin portion composed of a first resin material and a second resin portion composed of a second resin material having a different thermal shrinkage from a thermal shrinkage of the first resin material are connected in a state of at least partially not overlapping, the resin component further comprising a discontinuous portion at a portion inward of a boundary location of the second resin portion with the first resin portion, wherein the discontinuous portion is a cut having a V shape when seen from above, and a connecting point of two sides of a V shape of another through hole or bottomed hole is positioned within an area defined by three sides connecting three end points of the V shape,
the method comprising:
supplying the first resin material into a portion of a cavity configured to mold the first resin portion of the molded resin component; and
supplying the second resin material into a portion of the cavity configured to mold the second resin portion of the molded resin component, the cavity comprising a V-shaped projection disposed at a portion closer to the second resin portion than a boundary location between the first resin portion and the second resin portion of the molded resin component, to form the cut having the V shape.

* * * * *